United States Patent
Federwisch

(10) Patent No.: US 6,889,228 B1
(45) Date of Patent: May 3, 2005

(54) CASCADING SUPPORT FOR MIRRORED VOLUMES

(75) Inventor: Michael Federwisch, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 416 days.

(21) Appl. No.: 09/823,238

(22) Filed: Mar. 29, 2001

(51) Int. Cl.[7] .............................................. G06F 17/00
(52) U.S. Cl. ................................................... 707/102
(58) Field of Search ...................... 707/103 R, 104.1, 707/102, 100; 711/1

(56) References Cited

U.S. PATENT DOCUMENTS

| | | | |
|---|---|---|---|
| 4,819,159 A | | 4/1989 | Shipley et al. |
| 4,887,204 A | | 12/1989 | Johnson et al. |
| 5,317,731 A | | 5/1994 | Dias et al. |
| 5,604,862 A | | 2/1997 | Midgely et al. |
| 5,644,718 A | | 7/1997 | Belove et al. |
| 5,819,292 A | | 10/1998 | Hitz et al. |
| 5,852,715 A | * | 12/1998 | Raz et al. .................... 709/201 |
| 5,873,098 A | * | 2/1999 | Bamford et al. ............ 707/203 |
| 5,963,962 A | | 10/1999 | Hitz et al. |
| 6,088,757 A | * | 7/2000 | Boonie et al. ............... 710/200 |
| 6,216,211 B1 | * | 4/2001 | McBrearty et al. ......... 711/162 |
| 6,272,536 B1 | * | 8/2001 | van Hoff et al. ............ 709/217 |
| 6,317,844 B1 | * | 11/2001 | Kleiman ........................ 714/6 |
| 6,321,308 B1 | * | 11/2001 | Arnon et al. ................ 711/147 |
| 6,442,682 B1 | * | 8/2002 | Pothapragada et al. ......... 713/1 |
| 6,658,513 B1 | * | 12/2003 | Boonie et al. .............. 710/200 |

FOREIGN PATENT DOCUMENTS

| | | |
|---|---|---|
| DE | 694 25 658 T2 | 4/2001 |
| EP | 0 702 815 B1 | 8/2000 |
| WO | WO 94/29807 A1 | 12/1994 |
| WO | WO 00/07104 A1 | 2/2000 |

OTHER PUBLICATIONS

Steven R. Kleiman et al., "Using NUMA Interconnects for Highly Available Filers", Jan.–Feb. 1999. IEEE.
SLASHDOT.TUX2: "The Filesystem That Would Be King", Oct. 17, 2000.

* cited by examiner

Primary Examiner—Alford Kindred
Assistant Examiner—Sana Al-Hashemi
(74) Attorney, Agent, or Firm—Swernofsky Law Group PC

(57) ABSTRACT

Propagation of data by mirroring the data from a first filer to a second filer, and then mirroring the data from the second filer to a third filer. More generally, propagating data by mirroring the data along a chain or cascade of mirrors. Snapshots are used in mirroring the data. Preferably, the data is organized in one or more volumes on the filer, and one or more of the volumes are mirrored. Deletion is prevented of a snapshot associated with a volume from a filer until the filer is informed that no other filer needs that snapshot to mirror the volume from the filer. Preferably, each filer uses softlocks to track what snapshots correspond to volumes mirrored down the chain or cascade of filers.

27 Claims, 6 Drawing Sheets

CASCADING SUPPORT FOR MIRRORED VOLUMES

BACKGROUND OF THE INVENTION

1. Field of the Invention

The invention relates to propagating data through a chain or cascade of file servers. In particular, the invention relates to mirroring data from a file server that in turn has mirrored that data from another file server.

2. Related Art

Modern computing networks often store vital information on file servers ("filers"). In order to protect this information from catastrophes, the information often is backed up off-site to another filer. This other filer is said to "mirror" the original filer.

In some existing systems, filers utilize a write anywhere file system layout (WAFL) implemented on a redundant array of inexpensive disks (RAID). In WAFL, changes to files do not result in deletion of old versions of the files. Rather, new file system blocks are assigned to a changed file, and changes to the file are written to the new blocks. The old blocks retain their data and are not deleted. Rather, a block map associates the new blocks with the changed file.

WAFL technology allows for efficient mirroring of a filer though the use of snapshots. A snapshot includes copies of blocks and a block map for a volume (i.e., portion of a file system) at a past consistency point at which the volume on the filer was self-consistent.

In order to mirror a volume a first time, a snapshot is copied to the mirror. In order to update the mirror of the volume, the original filer creates a new snapshot for the volume and sends the block map for the new snapshot to the mirror. The original filer also compares the new block map with a block map from a previously sent snapshot, thereby determining what new blocks have been used in the WAFL volume since that previously sent snapshot. Only these new blocks are sent to the mirroring filer, thereby improving efficiency over techniques that copy the entire volume from the original filer to the mirror.

In some circumstances, the mirroring filer can be used for remote data access and is more accessible to a client or user than the original filer. For example, the original and the mirror could be on different sides of a country or even different sides of the world. In addition, sometimes a more cost-efficient connection is available for accessing the mirror as opposed to the original. Thus, the mirror often is available in a read-only configuration for access by clients and users.

Use of a mirror in this manner can have other advantages. For example, if too many clients and users attempt to access the original filer, the load on the filer can adversely impact system performance. The mirror can take on some of this load, reducing the number of accesses to the original filer and thereby improving the original filer's performance.

As use of computerized information has become more widespread, use of more than one mirror has become prevalent. According to known technologies, each mirror copies data from the original filer. Unfortunately, if the link between the original filer and the mirrors is long, unreliable, and/or expensive, the arrangement between the original filer and the mirrors begins to suffer problems. In particular, copying data from the original to all of the mirrors can use too much bandwidth on potentially expensive connections. In addition, the load on the original filer can rise to the point where the original filer's own performance and accessibility degrades unacceptably.

SUMMARY OF THE INVENTION

The invention provides a technique for addressing the foregoing deficiencies of the art by allowing a filer to mirror from another mirroring filer, thereby forming a chain or cascade of mirroring filers. Advantageously, other filers can access and/or mirror from whichever filer is most readily, securely, and/or inexpensively available. Mirrors can be adjusted to connect to other submirrors, providing flexibility. Load can be balanced to have submirrors distribute data that the original previously needed to distribute.

The invention provides for arrangements other than straight chains and cascades. More than one filer can mirror volumes to another filer, and more than one filer can mirror volumes from another filer.

A preferred embodiment of the invention uses a write anywhere file system layout (WAFL) and snapshots. Mirroring is done by "differencing." This requires that the latest snapshot transferred to a mirror must be kept on the server so the mirroring can be done.

In some circumstances, it is desirable to be able to delete an old snapshot from a mirrored filer. In particular, in order to re-use blocks on the original filer, any old snapshot that references those blocks needs to be deleted. The blocks can then be freed.

However, a problem arises if a volume on a mirroring filer is only current up to the time of a deleted snapshot on the original filer. As described above, the original filer compares a previous snapshot with a current snapshot in order to mirror the volume efficiently. If the previous snapshot is deleted, this comparison cannot occur. Furthermore, the original filer may have re-used blocks from the deleted snapshot, leading to inconsistencies between the block maps maintained by the original filer and the mirror. Because the original version controls which snapshots exist (it is the only writeable version), it is the only volume that can delete a snapshot. Also, since certain mirrors depend on snapshots of other mirrors, the original must be able to understand which snapshots can be deleted and which must stay.

Similar problems can arise when mirroring volumes from filers that in turn mirror volumes from one or more other filers.

The invention addresses the foregoing problems by preventing deletion of a snapshot of a volume until the filer is informed that no other volume requires that snapshot to continue the mirror. Preferably, each filer tracks what snapshots correspond to volumes mirrored down the chain or cascade of filers. A snapshot needed for mirroring a volume is marked with a "softlock" which prevents deletion of that snapshot.

In this type of mirroring, there is a point in time where changes from a source volume are made visible on a destination volume. This is called "jump ahead" because the data appears to jump ahead in time. If a mirror is mirroring to another mirror, jump ahead is not be appropriate.

In a preferred embodiment, the invention utilizes jump ahead protection during mirroring operations. This stops "jump ahead" when it would not be appropriate.

Also according to the invention, since snapshots are used to determine differences to be propagated to submirrors and snapshots cannot be created on mirrors because they are preferably read-only, the invention includes techniques to determine differences using existing snapshots.

The invention encompasses methods that implement the foregoing techniques, as well as devices and signals used to carry out the methods, instructions stored in computerreadable media such as memory, disks, and CD-ROMs for carrying out these methods, and data structures used by the methods.

This summary has been provided so that the nature of the invention may be understood quickly. A more complete understanding of the invention may be obtained by reference to the following description of the preferred embodiments thereof in combination with the attached drawings.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

Inventions described herein can be used in conjunction with invention(s) described in the following documents:

Application Ser. No. 09/127,497, filed Jul. 31, 1998, in the name of Steve Kleiman et al., titled "File System Image Transfer," issued Aug. 5, 2003, as U.S. Pat. No. 6,604,118.

Applicant Ser. No. 08/454,921, filed May 31, 1995, in the name of David Hitz et al., titled "Method for Maintaining Consistent States of a File System and for Creating User-Accessible Read-Only Copies of a File System," issued Oct. 6, 1998 as U.S. Pat. No. 5,819,292.

These documents are hereby incorporated by reference as if fully set forth herein.

The terms "mirroring filer" and "mirrored filer" are used in this disclosure. "Mirroring filer" refers to a filer that copies or receives data from another filer, thereby acting as a mirror of that other filer. "Mirrored filer" refers to the filer from which the data is copied or sent. The term "source filer" is synonymous with the term "mirrored filer," and the term "destination filer" is synonymous with the term "mirroring filer."

Figure 1:
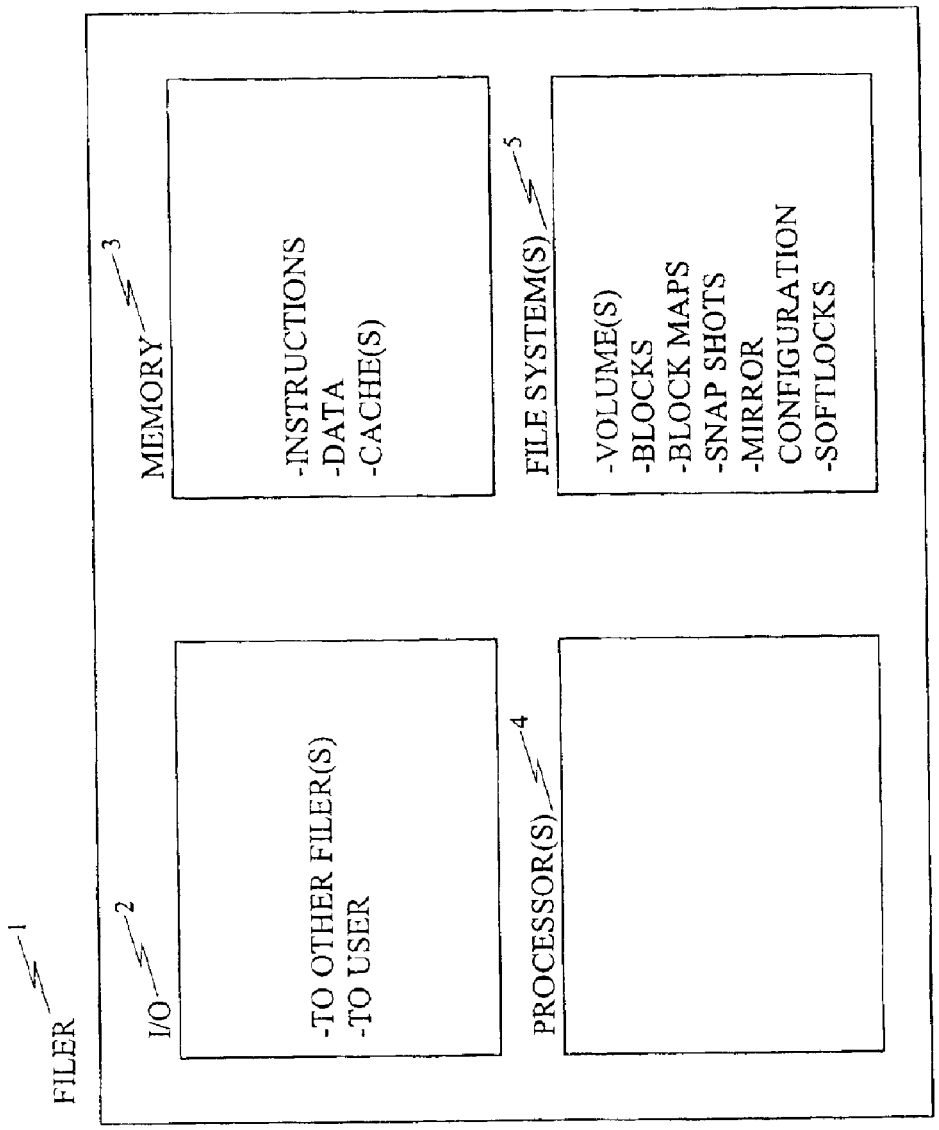
FIG. 1 is a block diagram of a filer according to the invention.

FIG. 1 is a block diagram of a filer according to the invention. Filer 1 is described herein by way of example only. The invention is in no way limited to the particular configuration and arrangement of filer 1.

Filer server ("filer") 1 in FIG. 1 includes I/O 2, memory 3, processor(s) 4 and file system(s) 5. I/O 2 includes input and output devices and interfaces, for example for communication with other filer(s) and with users. I/O 2 can include a keyboard, a mouse, a display, interfaces to a network or networks, etc. Memory 3 preferably includes RAM and ROM and stores instructions for operating filer 1 according to the invention. Memory 3 also preferably includes data, cache(s), etc. Processor(s) 4 control the operation of filer 1, preferably based on instructions stored in memory 3 and/or file system(s) 5.

File system(s) 5 preferably are implemented using a write anywhere file system layout (WAFL) on a redundant array of inexpensive disks (RAID), although the invention is not limited to WAFL or RAID. For example, besides RAID disks, file system(s) 5 can include removable storage media such as diskettes and CD-ROMs, other fixed disks, and the like. File system(s) 5 preferably store one or more volumes of data, preferably including instructions for operating filer 1.

In WAFL, changes to files in a volume do not result in deletion of old versions of the files. Rather, new file system blocks are assigned to a changed file, and changes to the file are written to the new blocks. A block map associates the new blocks with the changed file.

WAFL technology allows for efficient mirroring of a filer though use of snapshots, which are copies of the block map and blocks for a volume (i.e., portion of a file system) at a consistency point at which the volume on the filer is self-consistent. Blocks included in a snapshot preferably are not deleted from a volume, even if those blocks are no longer part of an active file (i.e., they are part of a file that has changed to include different data from that in the blocks).

The fact that a WAFL file system preferably does not delete blocks that are part of a snapshot allows a new snapshot to be compared with an old snapshot so as to determine what exactly has changed in the associated volume between the time of the two snapshots. This capability allows for efficient updating of mirrors.

In more detail, according to previous mirroring techniques, a first time a volume is mirrored from a source filer to a destination filer, a snapshot of the volume is copied from the source filer to the destination filer. In order to send an updated mirror, the source filer makes a new snapshot of the volume. The source filer compares the new snapshot with the still existing previously-sent snapshot on the source filer in order to determine the differences between the snapshots. Only these differences have to be sent to the destination file to update the mirror. The differences preferably are sent in the form of any newly used blocks and a blockmap for the new snapshot.

After the new blocks and blockmap (or blockmap update information) are sent to the destination filer, that destination filer still retains all of the old blocks and the blockmap for the previous mirror sent to the destination filer. Thus, even while the new blocks are being loaded, the old version of the volume is fully accessible. Once the new snapshot and blocks are present, a WAFL filer only has to change a single reference from the old block map to the new one for the new snapshot, and the updated volume becomes available. The process of changing this pointer is known as "activating" the new snapshot. Activating a snapshot causes the contents of the mirrored volume to "jump ahead" from the old version to the new version.

The foregoing operation requires that the old snapshot be retained on the source mirror so that the comparison between old and new snapshots can be performed. With previous mirroring techniques, the snapshot is simply maintained on the source filer until the next update of the mirror is sent to the destination filer. After the next update is sent, the old snapshot is not longer needed and can be deleted. According to these old techniques, any blocks in the old snapshot but not in the new snapshot also can be deleted, thereby freeing up disk space.

Retention requirements for snapshots change with cascaded or chained mirroring according to the invention, as explained below. In cascaded or chained mirroring, a filer mirrors one or more volumes from a filer that in turn mirrors from yet another filer.

For the sake of reference, filers that mirror to other filers are considered to be "upstream," and filers that mirror from other filers are considered to be "downstream." In addition, filers that are downstream of a mirroring filer are referred to as "submirrors" of that filer.

Only the most upstream filer for a volume in a chain or cascade of mirroring filers preferably can create and delete snapshots of that volume. This most upstream filer is referred to as the "master" filer for a volume. The copy of the volume on the master filer for that volume is referred to as the "master volume." As described above, deleting a snapshot from the master renders later comparisons for mirroring from the master filer impossible.

For a filer to mirror a volume to another volume, all but the master filer must use existing snapshots to determine the differences (i.e., new blocks and changes to blockmap) that need to be transferred to update a mirror of a volume on a downstream filer. As a result, if the mirror of a filer has not been updated since the last time the mirror was sent downstream, the filer cannot determine any differences and the update cannot be sent downstream.

A filer in a cascade or chain of filers must retain snapshots that its submirrors require for mirroring volumes to their submirrors. Because the master filer is the only one that can delete these snapshots, care must be taken to ensure that the master filer does not delete snapshots required by downstream filers that mirror the volume. A snapshot is required if the master filer needs that snapshot for differencing with a current snapshot in order to determine what blocks must be sent to a downstream filer to update a mirror. Thus, if any filer is current only up to a snapshot on the master filer, that snapshot is needed for mirroring to that filer.

Thus, the invention addresses limitations in the prior art that do not allow mirrors to be sources for other mirrors. Specifically, the invention makes sure that snapshots are not deleted from a master volume if those snapshots are required for maintenance of submirrors. The invention allows mirrors to use the existing snapshots to determine what blocks need to be transferred to submirrors in order to update mirrored volumes on those submirrors.

According to the invention, filer 1 preferably includes softlocks for marking snapshots in file system(s) 5 to indicate that those snapshots need to be retained (i.e., should not be deleted) for mirroring to submirrors. In a preferred embodiment, each filer maintains softlocks that indicate what snapshots on the filer correspond to volumes mirrored to downstream filers. Alternatively, each filer can include softlocks only about what volumes are mirrored to immediately adjacent filers.

In one embodiment of the invention, the softlocks are metadata stored in a registry for file system(s) 5. The metadata can comprise registry keys that describes snapshots and key values that indicates what filer(s) mirror the snapshots. The registry keys and key values preferably are stored in file system(s) 5, although they can be stored in memory 3, for example in a memory cache, for more efficient access during file system operations.

Each filer preferably implements a command that uses the mirror softlock information to determine and to display all destinations for any particular mirrored volume(s).

The operation of filers in preventing deletion of snapshots based on softlocks is explained in more detail below with reference to FIG. 5.

Returning to FIG. 1, file system(s) 5 preferably also include a mirror configuration file for user configuration of mirroring operations. Preferably, mirroring occurs at predetermined regular intervals set forth in the mirror configuration file. A cron-like format can be used for this mirror frequency information. "Cron" is well-known in the art of scheduling and allows great flexibility in scheduling mirroring operations.

In the preferred embodiment, the invention is implemented on a system that already implements conventional mirroring, for example using SnapMirror™ software developed by Network Appliance, Inc. When the invention is implemented on such a system, the existing snapmirror.conf file is used as the configuration file for the cascaded mirroring. In order to implement the invention, the existing snapmirror.conf file may have to be edited to reflect the cascaded mirroring made possible by the invention.

In addition to the mirror configuration file, a command entered into either a filer or a mirror of that filer also preferably could initiate a mirroring operation.

Figure 2:
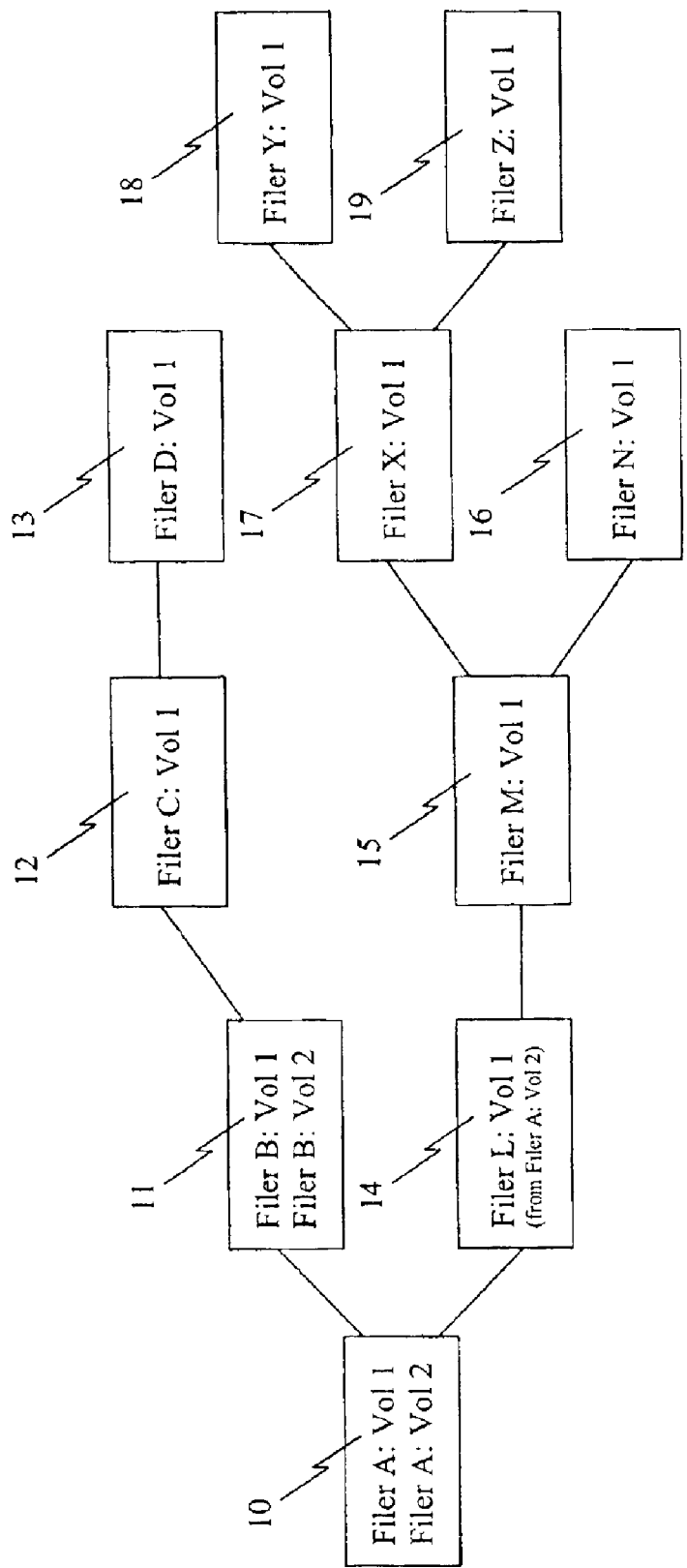
FIG. 2 is a block diagram of a cascade of filers according to the invention.

FIG. 2 is a block diagram of repeated mirroring of filers according to the invention. Briefly, the invention propagates data by mirroring the data from a first filer to a second filer, and then mirroring the data from the second filer to a third filer. Snapshots are used in mirroring the data. Preferably, the data is organized in one or more volumes on the filer, and one or more of the volumes are mirrored.

In more detail, FIG. 2 shows an expansion of the idea of repeated mirroring into a cascade of mirrors. The term "cascade" is meant to convey a tree-like arrangement of filers along which volumes are mirrored. The invention is not limited by this term, which is merely used to help convey a general understanding of one possible embodiment of the invention. Of course, the invention also is not limited to the particular cascade shown in FIG. 2.

In FIG. 2, filer A 10 contains two volumes, vol1 and vol2. Filer A 10 is the master filer for these volumes. Filer B 11 mirrors both of these volumes from filer A 10. Filer C 12 mirrors vol1 from filer B 11, and filer D 13 mirrors vol1 from filer C 12.

Filer L 14 mirrors vol2 from filer A 10. This mirrored volume is designated as vol1 on filer L 14 because it is the only volume stored on filer L 14.

Filer M 15 mirrors vol1 from filer L 14 (equivalent to vol2 on filer A 10), and filer N 16 mirrors vol1 from filer M 15. Filer X 17 mirrors vol1 from filer M15, and filers Y 18 and Z 19 mirror vol1 from filer X 17.

Each filer preferably is configured along the lines of filer 1 in FIG. 1. Thus, each filer preferably stores softlocks. On filer A 10, the softlocks preferably indicate that snapshots of vol1 are needed by filers B 11, C 12 and D 13 because those filers mirror vol 1 from filer A 10. The softlocks likewise indicate that snapshots of vol2 on filer A 10 are needed for mirroring to filer L 14, M 15, N 16, X 17, Y 18, and Z 19. The other filers preferably include similar types of softlocks. Thus, the softlocks preferably can be used to determine any submirrors from any mirror in a cascade or tree of mirrors. Alternatively, the softlocks on each filer could include only information about what volumes are directly mirrored to other filers (e.g., from filer A 10 to B 11 in FIG. 2).

In order to maintain this softlock information, each filer preferably propagates information upstream about what volumes are mirrored downstream from that filer. The filers pass this information upstream to the master filer for each volume. This propagation preferably only happens when a mirror is updated to a downstream filer, but is not limited to this time. The filers uses the propagated information, preferably in the form of softlocks, to prevent deletion of snapshots needed by the downstream filers, as explained in more detail below with reference to FIG. 5.

Figure 3:
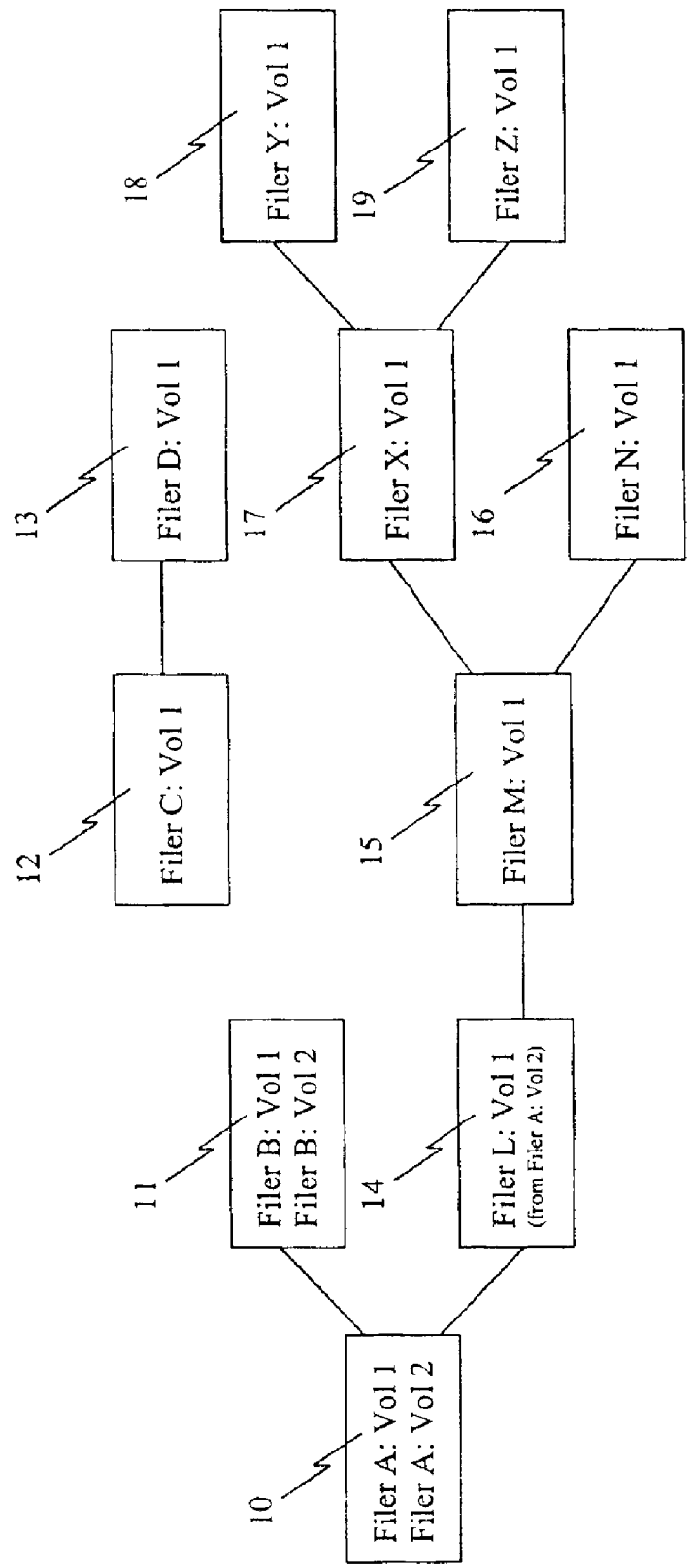
FIG. 3 is a block diagram of a cascade of filers in which a mirroring relationship has been released according to the invention.

FIG. 3 is a block diagram of a cascade of filers in which a mirroring relationship has been released according to the invention. A mirroring relationship for a volume preferably is released through entry of a command at the mirrored filer.

As discussed above, each mirror that is part of a cascade or chain of mirrors preferably maintains softlock information regarding what snapshots are needed by all downstream mirrors. With this information, any filer can become a master filer for downstream mirrors.

When a release command is entered, the softlocks on the mirrored filer preferably are adjusted to reflect that one or more volumes are no longer going to be mirrored from that filer. The release command thereby tells a filer that it can delete snapshots associated with the released volume. After the softlocks are propagated to the old master filer for the associated volume, the old master filer also can delete the associated snapshots. Softlocks on any intermediate filers likewise are updated to indicate that the associated snapshots on those filers can be deleted.

For example, in FIG. 3, the command "snapmirror release vol1 filerC:vol1" has been entered at filer B 11. As a result, vol1 is no longer mirrored to filer C 12, as illustrated by the lack of a line between filer B 11 and filer C 12.

The softlock(s) for any snapshot(s) on filer B 11 corresponding to the released volume preferably are updated to indicate that the snapshot(s) are no longer needed for mirroring the volume to other filer(s). Softlocks on filer A 10 associated with snapshots for mirroring from filer B 11 to filer C 12 preferably are also updated to reflect the change in mirroring.

When the mirroring relationship between filers B 11 and C 12 is released, filer C 12 becomes the master filer for mirroring vol 1 to filer D 13. In order to act as the master filer, filer C 12 preferably contains softlock information about what snapshots it should maintain in order to ensure that mirroring to submirrors is possible. This softlock information preferably is already present based on previous updates of the information propagated from downstream filers.

Figure 4:
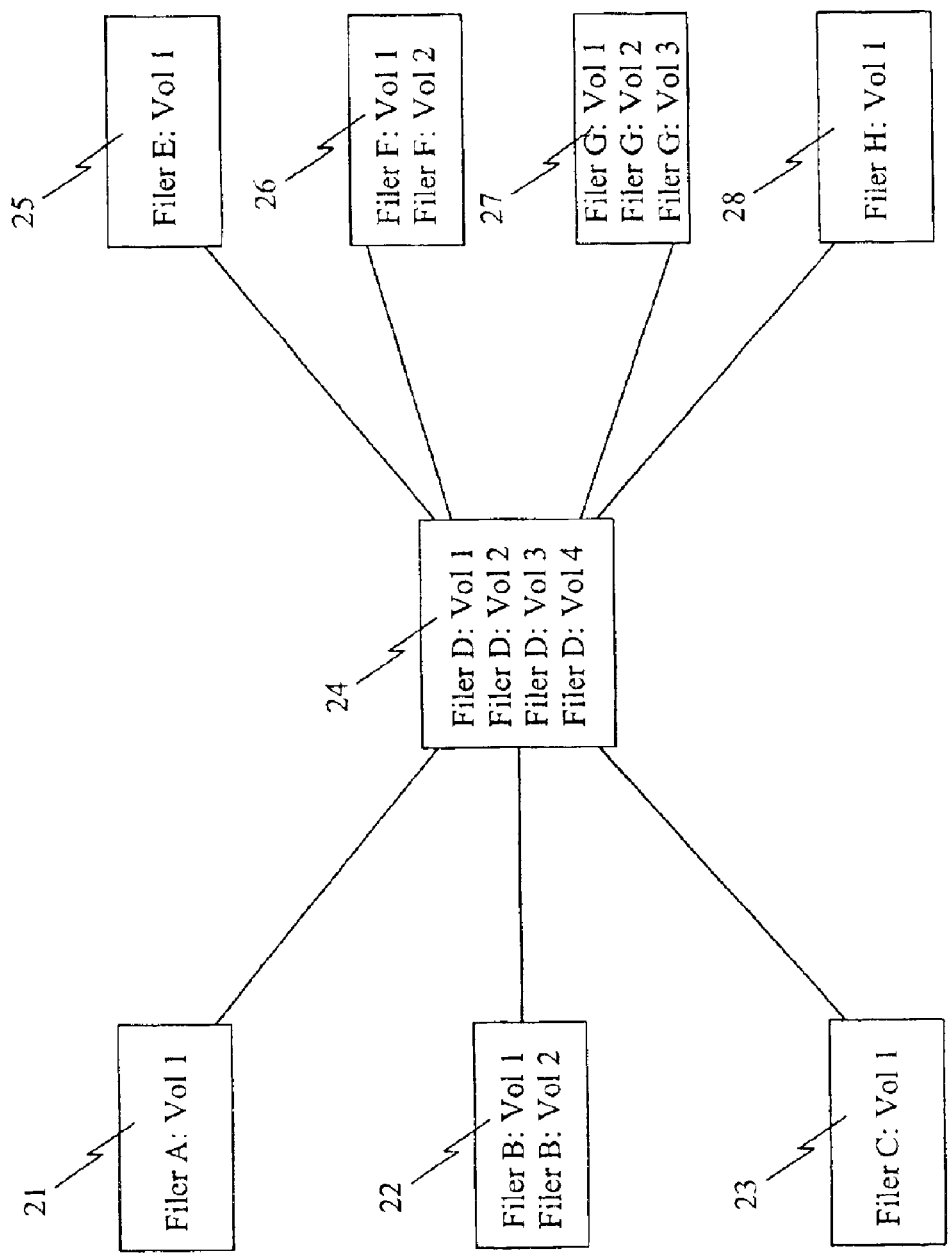
FIG. 4 is a block diagram illustrating plural filers mirroring to and from another filer according to the invention.

FIG. 4 is a block diagram illustrating plural filers mirroring to and from another filer. In FIG. 4, filers A 21, B 22, and C 23 mirror all volumes to filer D 24. Filer D 24 then mirrors various ones of the volumes to filers E 25, F 26, G 27 and H 28. This figure illustrates the versatility of cascaded mirroring according to the invention.

Other mirroring arrangements are possible. For example, one particularly useful arrangement for international businesses is to mirror plural volumes from plural filers to one filer in one country, mirror all of those volumes to another filer in another country using one communication link, and then mirror the volumes to various destinations from that filer. This configuration reduces the number of possibly expensive international data transfers.

Figure 5:
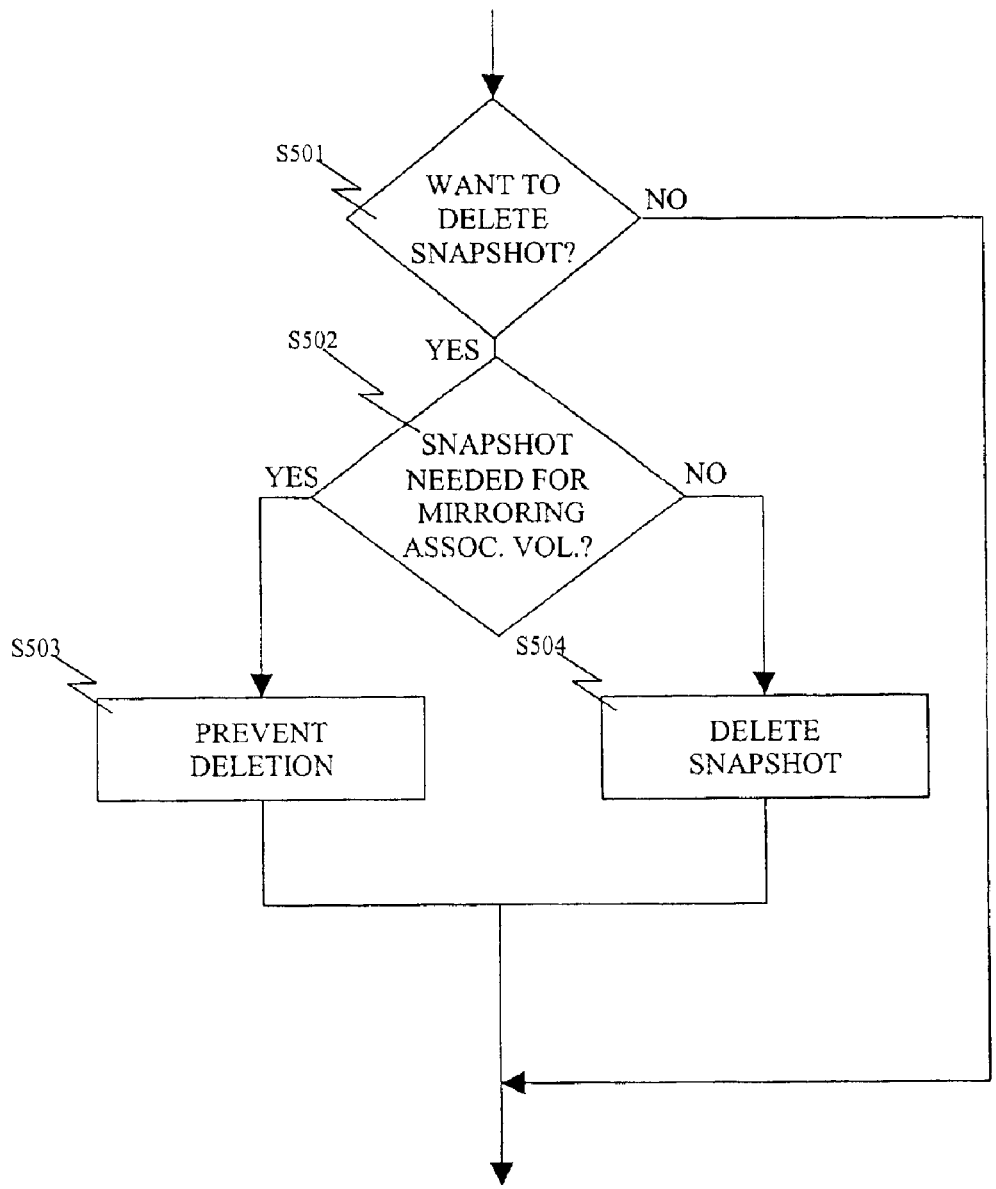
FIG. 5 is a flowchart for explaining maintenance of snapshots in a filer in a chain or cascade of filers according to the invention.

FIG. 5 is a flowchart for explaining maintenance of snapshots in a filer in a chain or cascade of filers according to the invention.

Briefly, deletion of a snapshot associated with a volume on a filer is prevented until the filer is informed that no downstream filer will need that snapshot to mirror the volume from the filer. Preferably, each filer uses softlocks to mark snapshots needed for mirroring volumes downstream in a cascade or chain of filers, thereby preventing deletion of those volumes.

In more detail, a filer in step S501 attempts to delete a snapshot associated with a volume on the filer. This attempt could be a result of a user command, of routine deletion of stale data, or of some other operation.

Step S502 determines if the snapshot is needed for mirroring the associated volume to any other filers. A snapshot is needed if a master filer needs that snapshot for differencing with a current snapshot in order to determine what blocks must be sent to a downstream filer to update a mirror. Thus, if any filer is current only up to a snapshot on the master filer, that snapshot is needed for mirroring to that filer. Such snapshots preferably are marked with softlocks. Alternatively, all snapshots associated with a volume mirrored to any downstream filer can be softlocked. Thus, in a preferred embodiment, the filer can make this determination in step S502 by checking for a softlock on the snapshot.

If the snapshot is needed for mirroring the associated volume, deletion of the snapshot is prevented in step S503. Otherwise, the snapshot is deleted in step S504. Blocks associated with the snapshot can then be released for re-use as long as those blocks are not associated with another remaining snapshot.

Another issue that can arise with cascaded mirroring is the problem of inappropriate "jump ahead." Jump ahead occurs when an updated snapshot of a volume on a filer is activated. When the snapshot is activated, the updated volume appears to jump ahead from the time of the previous update. If jump ahead occurs while a filer is mirroring to another filer, the jump ahead can corrupt or otherwise interfere with the mirroring operation. The invention prevents jump ahead by ensuring that activation of an updated snapshot from an upstream filer cannot occur while sending a mirror to a downstream filer.

Figure 6:
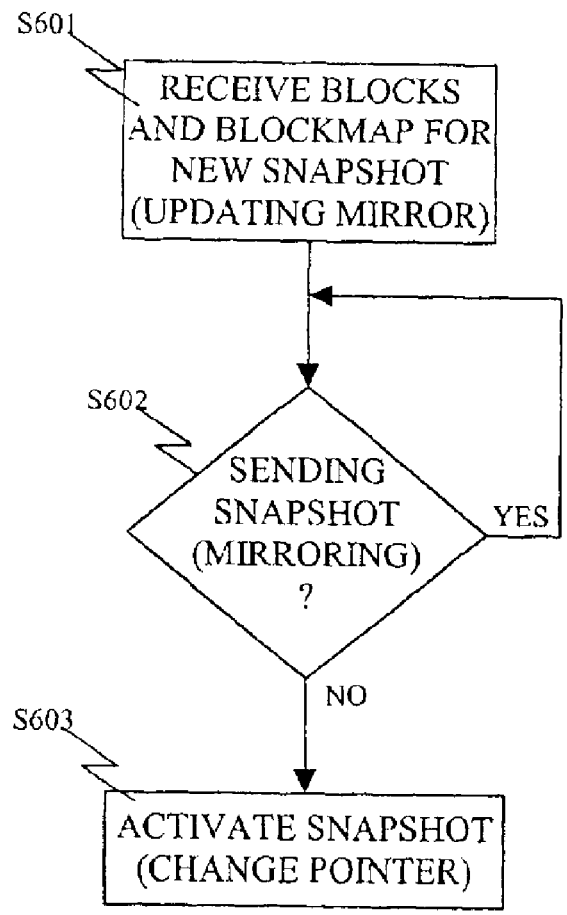
FIG. 6 is a flowchart for explaining jump ahead protection in a filer in a chain or cascade of filers according to the invention.

FIG. 6 is a flowchart for explaining jump ahead protection in a filer in a chain or cascade of filers according to the invention. Briefly, one possible technique for jump ahead protection is to prevent activation of a snapshot of a volume while mirroring the volume to another filer.

In more detail, in step S601 a filer receives blocks and an updated blockmap (or update information for a blockmap) for an updated mirror (i.e., snapshot) of a volume from an upstream filer. In order to activate this snapshot, thereby making the updated mirror of the volume available, the file preferably can simply change a pointer to the updated blockmap.

However, before activating the new snapshot, the filer in step S602 makes sure that it is not in the process of sending a mirror to another filer. If the filer is in the processes of sending a mirror to another filer, the filer waits until finished before proceeding to step S603, where the new snapshot is activated. By virtue of this technique, jump-ahead of a volume during a mirroring operation tends to be prevented.

Alternative Embodiments

Although preferred embodiments are disclosed herein, many variations are possible which remain within the concept, scope, and spirit of the invention, and these variations would become clear to those skilled in the art after perusal of this application without further invention or undue experimentation.

What is claimed is:

1. A method of propagating data, comprising:
   mirroring the data from a first filer to a second filer; and
   mirroring the data from the second filer to a third filer;

wherein snapshots are used in mirroring the data, the data is organized in one or more volumes on the filers, one or more of the volumes are mirrored, and the first filer uses softlocks to mark snapshots needed for mirroring volumes from the first filer;

wherein deletion of a snapshot marked with a softlock is prevented.

2. A method as in claim 1, wherein deletion of a snapshot not marked with a softlock is permitted.

3. A method as in claim 2, wherein entry of a release command to the first filer informs the first filer that the second filer will no longer mirror the volume from the first filer, and wherein the softlocks are updated to indicate that any snapshot corresponding to the volume can be deleted.

4. A method as in claim 1, wherein the second filer uses softlocks to mark snapshots needed for mirroring volumes from the second filer, and wherein deletion of a snapshot marked with a softlock is prevented.

5. A method as in claim 1, wherein each filer uses softlocks to mark snapshots needed for mirroring volumes to any downstream filers, and wherein deletion of a snapshot marked with a softlock is prevented.

6. A method as in claim 5, wherein entry of a release command to the second filer informs the second filer that the third filer will no longer mirror the volume from the second filer, and wherein the softlocks are updated to indicate that any snapshot corresponding to the volume can be deleted.

7. A method of propagating data, comprising:
mirroring the data from a first filer to a second filer; and
mirroring the data from the second filer to a third filer;
wherein snapshots are used in mirroring the data, the data is organized in one or more volumes on the filers, and one or more of the volumes are mirrored; and
wherein jump ahead protection is used during mirroring operations, said jump ahead protection preventing activation of a snapshot of a volume while mirroring the volume to another filer.

8. A method as in claim 1, wherein the second filer also mirrors one or more volumes from a fourth filer.

9. A method as in claim 1, wherein a fourth filer also mirrors one or more volumes from the second filer.

10. A method as in claim 1, wherein the second filer also mirrors one or more volumes from a fourth filer, and wherein a fifth filer mirrors one or more volumes from the second filer.

11. A memory storing information including instructions, the instructions for propagating data, the instructions comprising mirroring the data from a first filer to a second filer for mirroring to a third filer;
wherein snapshots are used in mirroring the data, the data is organized in one or more volumes on the filers, one or more of the volumes are mirrored, and the first filer uses softlocks to mark snapshots needed for mirroring volumes from the first filer; and
wherein the instructions further comprise preventing deletion of a snapshot marked with a softlock.

12. A memory as in claim 11, wherein the instructions further comprise permitting deletion of a snapshot not marked with a softlock.

13. A memory as in claim 12, wherein the instructions further comprise, upon entry of a release command to the first filer that informs the first filer that the second filer will no longer mirror the volume from the first filer, updating the softlocks to indicate that snapshots corresponding to the volume can be deleted.

14. A memory as in claim 11, wherein the information further includes softlocks that mark snapshots needed for mirroring volumes from the second filer, and wherein the instructions further comprise preventing deletion of a snapshot marked with a softlock.

15. A memory as in claim 11, wherein the information further includes softlocks that mark snapshots needed for mirroring volumes to any downstream filers, and wherein the instructions further comprise preventing deletion of a snapshot marked with a softlock.

16. A memory storing information including instructions, the instructions for propagating data, the instructions comprising mirroring the data from a first filer to a second filer for mirroring to a third filer;
wherein snapshots are used in mirroring the data, the data is organized in one or more volumes on the filers, and one or more of the volumes are mirrored; and
wherein the instructions for mirroring further comprise instructions for jump ahead protection during mirroring operations, said jump ahead protection preventing activation of a snapshot of a volume while mirroring the volume to another filer.

17. A memory as in claim 11, wherein the second filer also mirrors one or more volumes from a fourth filer.

18. A memory as in claim 11, wherein the memory includes RAM, ROM, a disk, or a CD-ROM.

19. A filer that mirrors data to one or more other filers, comprising:
a file system that stores the data;
a processor; and
a memory storing instructions for the processor, the instructions comprising mirroring the data from the filer to a second filer for mirroring to a third filer, wherein snapshots are used in mirroring the data, the data is organized in one or more volumes on the filers, one or more of the volumes are mirrored, and the first filer uses softlocks to mark snapshots needed for mirroring volumes from the first filer;
wherein the instructions further comprise preventing deletion of a snapshot marked with a softlock.

20. A filer as in claim 19, wherein the instructions further comprise permitting deletion of a snapshot not marked with a softlock.

21. A filer as in claim 20, wherein the instructions further comprise, upon entry of a release command to the filer that informs the filer that the second filer will no longer mirror the volume from the filer, updating the softlocks to indicate that snapshots corresponding to the volume can be deleted.

22. A filer as in claim 19, wherein the file system further stores softlocks that mark snapshots needed for mirroring volumes to any downstream filers, and wherein the instructions further comprise preventing deletion of a snapshot marked with a softlock.

23. A filer that mirrors data to one or more other filers, comprising:
a file system that stores the data;
a processor; and
a memory storing instructions for the processor, the instructions comprising mirroring the data from the filer to a second filer for mirroring to a third filer;
wherein snapshots are used in mirroring the data, the data is organized in one or more volumes on the filers, and one or more of the volumes are mirrored; and
wherein the instructions for mirroring further comprise instructions for jump ahead protection during mirroring operations, said jump ahead protection preventing activation of a snapshot of a volume while mirroring the volume to another filer.

24. A filer as in claim 23, wherein the second filer also mirrors one or more volumes from a fourth filer.

25. A filer as in claim 23, wherein the file system utilizes a write anywhere file system layout implemented on a redundant array of inexpensive disks.

26. Data stored in a memory of a filer, the filer mirroring one or more volumes to a second filer for mirroring to a third filer, the data comprising one or more softlocks that indicate what volumes are mirrored to the second filer and the third filer, whereby deletion of snapshots associated with those volumes is prevented.

27. A method of propagating a file system, the method comprising:

mirroring data of the system from a first file server to a second file server; and mirroring the data from the second file server to a third file server; wherein:

snapshots are used in mirroring the data, each snapshot comprising all storage blocks required for the data and file structure of the file system;

the file system is organized in one or more volumes on the first and second file servers;

the first file server uses softlocks to mark snapshots needed for mirroring volumes from the first file server;

wherein deletion of a snapshot marked with a softlock can be prevented.

\* \* \* \* \*